Feb. 7, 1939.   W. BUSCHBECK   2,146,526
FREQUENCY MEASUREMENT MEANS
Filed Feb. 23, 1937
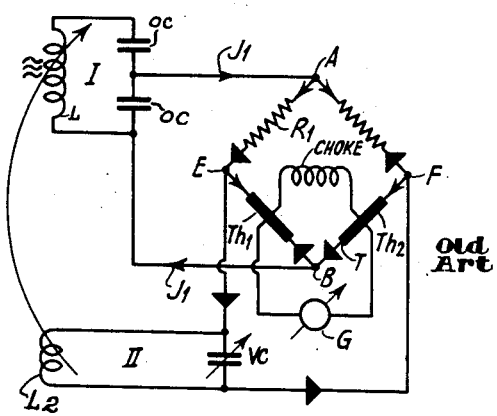
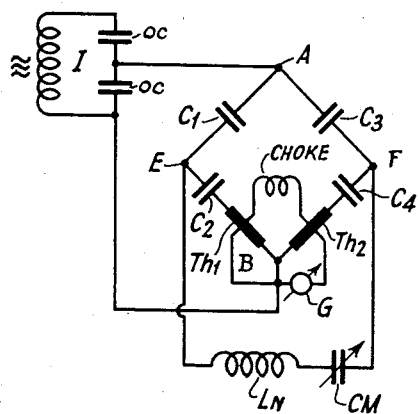
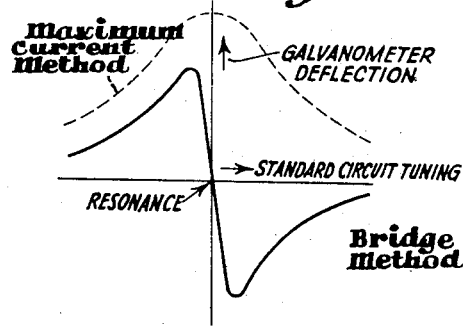
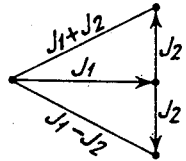
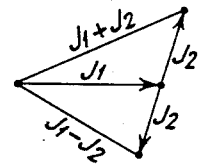
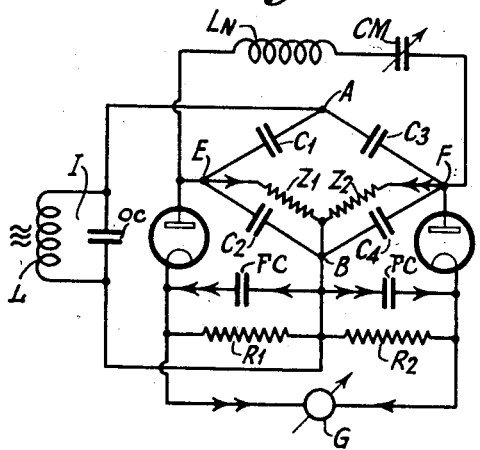
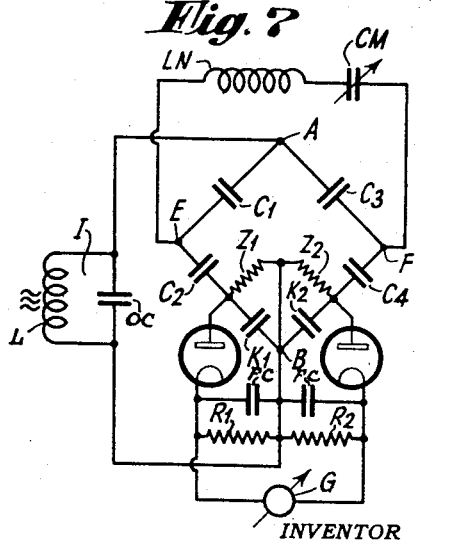
INVENTOR
WERNER BUSCHBECK
BY
ATTORNEY Patented Feb. 7, 1939

2,146,526

UNITED STATES PATENT OFFICE 2,146,526

FREQUENCY MEASUREMENT MEANS

Werner Buschbeck, Berlin, Germany, assignor to Telefunken Gesellschaft für Drahtlose Telegraphie m. b. H., Berlin, Germany, a corporation of Germany Application February 23, 1937, Serial No. 126,977
In Germany February 11, 1936

4 Claims. (Cl. 172—245)

This invention is concerned with an arrangement adapted to indicate phase displacement or shift angles (phase differences) between two alternating currents, and it is particularly suited to a wave meter for the measurement of short waves.

The method generally used for measuring wave lengths consists of using a calibrated tunable resonance circuit which is coupled with the oscillator and the point of resonance is established by the aid of some suitable indicator instrument or tell-tale device such as a meter, glow-lamp, or the like. However, it will be readily understood that such a measuring arrangement is rather inaccurate on the ground that the resonance peak or crest is really not exactly ascertainable. In fact, in the use of a thermal type instrument designed for a radio-frequency range of 1 ampere and standard resonance circuits, frequency measurements of $2 \times 10^7$ cycles, that is, equivalent to 15 meters, the accuracy under most favorable circumstances will be around ±2500 cycles, and this will be satisfactory only in a few cases.

This invention will best be understood and illustrated by the accompanying drawing, in which:

Fig. 1 shows a measuring circuit arrangement known in the prior art;

Fig. 2 is a vector diagram of the phase displacement of a frequency measuring circuit;

Fig. 3 is a vector diagram of the phase displacement of a frequency measuring circuit detuned;

Fig. 4 is a curve of potential difference as measured by a galvanometer;

Fig. 5 is a bridge circuit arrangement of this invention;

Fig. 6 is a bridge circuit arrangement of this invention having thermo-electric elements; and Fig. 7 is a bridge circuit arrangement of this invention having thermo-electric elements and two additional condensers in the bridge arms.

It has also been suggested in the prior art to determine resonance crests by the aid of a bridge arrangement acting as a phase angle meter. This arrangement as known in the art is illustrated in Fig. 1. I denotes the oscillator circuit comprising inductance L and condensers OC which is in coupling relationship with the wavemeter or standard circuit II comprising inductance $L_2$ and variable condenser VC. The radio frequency energy from both circuits is fed across diagonal points of a bridge, the arms of which consist wholly or partly of ohmic resistances.

In two adjacent arms are contained also two thermo-crosses $Th_1$ and $Th_2$ and the equalizing potentials of these are differentially connected by way of a galvanometer G. The arrows indicated in Fig. 1 show that in the bridge arms AF and EB there are flowing the differences, and in arms AE and FB the sums of the oscillator currents and the measuring or standard circuit currents.

The operation of the arrangement is predicated upon the fact that the standard circuit potential acting at the corners EF, because of the inductive circuit coupling, is phase displaced in reference to the oscillator voltage acting at points marked AB an angle of approximately ninety degrees. As can be seen from Fig. 2, the absolute values of the radio frequency currents flowing through the thermo-crosses $(J_1+J_2)$ and $(J_1-J_2)$ are equal to one another whenever the phase shift is exactly ninety degrees. If the standard or measuring circuit is detuned (Fig. 3), then the sum total of the currents is no longer equal to the difference, but rather either smaller or greater. The potential difference measured in galvanometer G between the direct current of the thermo-crosses therefore varies with the tuning of the standard circuit as shown graphically in Fig. 4. Fig. 4 also shows by the full line curve that the accuracy of the bridge method of this invention is better than that depending upon the mere adjustment of an instrument to maximum current shown by the broken-line curve. In the former instance, the change in deflection of the galvanometer needle in the presence of a change in tuning, attains a maximum value in the neighborhood of resonance. In the latter instance, however, the change in deflection in the neighborhood of the resonance frequency is equal to zero.

Still, the bridge method before outlined involves several disadvantages. In the first place, a marked circuit damping results from the use of ohmic resistances which tends to flatten or broaden the resonance curve of the circuits with an incidental impairment of sensitiveness of the arrangement. Moreover, the response or sensitivity of the scheme is not entirely independent of the frequency of the measured wave. This is ascribable to the fact that inevitable stray or spurious couplings of inductances, circuit damping, etc. are affected by the wave-length and that the ratio between the primary potential and the secondary potential which under most favorable conditions is as 1:1 will be affected.

Now, the present invention is concerned with a bridge arrangement in which these disadvantages are obviated.

According to the invention, the bridge is wholly or predominantly built up of reactances. Moreover, the coupling of the standard measuring circuit with the oscillator which in past practice has been external is replaced by an internal coupling in the bridge itself in that the bridge is detuned, and more particularly is so detuned that two opposite reactances, say, capacitive reactances, are chosen greater or smaller than the other two.

Referring to Fig. 5, $C_1$, $C_2$ are chosen greater than $C_3$, $C_4$, with the result that points E and F are not equipotential points, but rather present a potential difference, the size of which is governed by the capacitive voltage division of the oscillator potential prevailing between points A, B and which is different for the two halves of the bridge. Across the points E, F the measuring circuit LN CM is connected directly. By virtue of inner coupling, the relationship between oscillator potential and standard potential is constant and independent of the wave-length with the result that the bridge constitutes a perfectly independent and self-contained system which will always work under the same circumstances, and which has to be calibrated only once because of the absence of variable spurious couplings. Because of the capacitive nature of the bridge reactances it is feasible to use the bridge in whole or in part to act as a circuit capacity in the oscillator circuit, so that the damping of the circuits may be minimized. By the aid of this measuring arrangement it is possible to make nearly exact measurements of frequencies of $2\times10^7$ cycles, or 15 meters, to within 125 cycles.

However, the sensitiveness of the arrangement is further improvable in that it is not the currents $(J_1+J_2)$ and $(J_1-J_2)$ that are measured in the bridge arms by the aid of thermo-electric elements whose direct current voltages are connected differentially, but that the voltages are determined at corresponding points and are then compared in some suitable manner. This is attainable, for instance, by the aid of rectifiers connected in a circuit organization as illustrated in Fig. 6.

In a circuit arrangement as shown in Fig. 6, the condenser $C_1$, for example, could be made a little larger than the other condensers. In this instance, the voltage between E and B is higher than between F and B, so that the rectifiers supply different currents even in the presence of resonance of the standard circuit. However, inasmuch as in the galvanometer the difference of the potentials arising across the resistances $R_1$ and $R_2$ is measured, $R_1$, for instance, could be chosen smaller than $R_2$ with the result that the galvanometer deflection will be zero in the presence of exact resonance. $Z_1$ and $Z_2$ are leak resistances or choke-coils which close the rectifier circuits.

If the detuning of the bridge is made symmetric $$(C_1=C_4 \gtrless C_2=C_3)$$

it follows that the currents in the two halves of the bridge are equal to one another. The measurement of the voltage is effected suitably across two additional condensers of like size $K_1$ and $K_2$ in Fig. 7. $R_1$ and $R_2$ are then equal to each other.

It has been stated in the preamble that the measurement of frequencies when effected by means of an ordinary resonance indicator device, for $f=2\times10^7$ cycles or 15 meters wave-length is accurate only to within $\pm2500$ cycles. It is moreover shown that the accuracy has been improved, by the aid of a detuned capacity bridge comprising thermo-crosses, to within $\pm125$ cycles for the same frequency; but by the voltage-measuring scheme as last described, comprising the use of rectifiers, the reading accuracy is raised to within $\pm25$ cycles, and this is a precision which will prove sufficient in the majority of cases.

However, a further essential improvement in precision is obtainable in that the two rectifiers are provided with a common leak resistance. Referring to the drawing, this is accomplishable in that the rectifier anodes are inter-connected for direct current voltage. This condition is readily fulfillable in that the resonance circuit instead of a series arrangement of LN and $C_M$ as in Fig. 6 is made to consist of a parallel arrangement of LN and $C_M$. In this instance, the resistances $Z_1$ and $Z_2$ may be combined into one resistance which is associated with the midpoint of the coil. The resistances will then no longer occasion damping for the wave-meter circuit. The enhanced operation and efficiency of this circuit scheme is readily understandable by the aid of the following consideration:

Suppose the leak resistances $Z_1$ and $Z_2$ have been chosen so high, and that the rectifiers have been dimensioned so amply that the bridge condensers $C_2$ and $C_4$ become charged practically to the crest value of the higher alternating potential applied thereto; in the presence of resonance, the voltage across both bridge condensers is equally high, and thus also the currents furnished from the two rectifiers. If, then, the alternating voltage at one rectifier, for instance, rises whereas it declines at the other rectifier an equal amount, as is true for slight detuning, it will be seen that both bridge condensers will be charged to a value which corresponds to the crest value of the higher potential. As a result, however, the rectifier with the lower alternating voltage will be rendered completely inoperative. Hence, the current in the null-type instrument, in the presence of even the slightest difference of the alternating voltages, would be furnished only by the left or else only by the right-hand condenser. Because of the finite size of the leak resistances, and because of internal resistances of the rectifiers, this change, in practical operation, will not be sudden, and yet will be evidenced substantially more steeply or conspicuously than is true of the rectifiers above mentioned operating with anodes which are separated for direct current potential.

In the bridge arrangements according to Fig. 6 and Fig. 7, there are interposed between the rectifier cathodes and the lower bridge point (which is most grounded) the resistances $R_1$ and $R_2$, also rectifier filter condenser FC to provide for filtering of the rectified current. Hence, it will be advantageous to employ either rectifiers furnished with indirectly heated cathodes in order that the source of filament voltage may be grounded, or else copper (oxide-type) rectifiers.

The arrangement hereinbefore disclosed could be suitably used for phase comparisons of two alternating currents also without the feature of inner coupling. Particularly because of the fact that the outer leak resistance is provided jointly for both rectifiers, there results a marked rise in sensitiveness so that also the slightest phase shifts in alternating currents, one of which is applied at points AB of the bridge, and the other one across points EF thereof with a phase displacement angle of ninety degrees, may be ascertained.

What is claimed is:

1. An arrangement for frequency measurements comprising a four arm bridge circuit, a capacitive reactance in each arm of said bridge circuit, and a standard measuring circuit including an oscillator which is so internally coupled to said bridge circuit that the bridge is detuned by having at least two of the capacitive reactances in the arms of said bridge of greater value than those in the other arms.

2. An arrangement for frequency measurements comprising a resonant circuit which is in coupling relationship with the circuit under test, means for comparing the sum and difference of two oscillation circuit currents in a bridge arrangement, said means comprising a four-arm bridge circuit having a plurality of capacitive reactances, the coupling between the two circuits being insured by means of a slight symmetric detuning of the bridge circuit arms, said means comprising the arrangement of said capacitive reactances in pairs of equal reactances for the symmetric detuning of each oppositely arranged bridge circuit arm.

3. An arrangement for frequency measurements comprising a resonant circuit which is in coupling relationship with the circuit under test, means for comparing the sum and difference of two oscillation circuit currents in a bridge arrangement, said means comprising a four-arm bridge circuit having a plurality of capacitive reactances, the coupling between the two circuits being insured by means of a slight symmetric detuning of the bridge circuit arms, said means comprising the arrangement of said capacitive reactances in pairs of equal reactances for the symmetric detuning of each oppositely arranged bridge circuit arm, and a rectifier connected in parallel relationship with two contiguous bridge circuit arms, the direct current output of the rectifier of one arm being connected in opposition with the rectifier of the other arm by means of an indicating instrument.

4. An arrangement for frequency measurements comprising a resonant circuit which is in coupling relationship with the circuit under test, means for comparing the sum and difference of two oscillation circuit currents in a bridge arrangement, said means comprising a four-arm bridge circuit having a plurality of capacitive reactances, the coupling between the two circuits being insured by means of a slight symmetric detuning of the bridge circuit arms, said means comprising an arrangement of said capacitive reactances in pairs of equal reactances for the symmetric detuning of each oppositely arranged bridge circuit arm, a rectifier connected in parallel relationship with two contiguous bridge circuit arms, the direct current output of the rectifier of one arm being connected in opposition with the rectifier of the other arm by means of an indicating instrument, and means for making phase comparisons of two alternating currents in each bridge circuit by having each rectifier connected by a common leak resistance.

WERNER BUSCHBECK.